United States Patent
Hill (10) Patent No.: US 10,409,353 B2
(45) Date of Patent: Sep. 10, 2019

(54) DYNAMIC CLOCK VOLTAGE SCALING (DCVS) BASED ON APPLICATION PERFORMANCE IN A SYSTEM-ON-A-CHIP (SOC), AND RELATED METHODS AND PROCESSOR-BASED SYSTEMS

(71) Applicant: QUALCOMM Incorporated, San Diego, CA (US)

(72) Inventor: Rexford A. Hill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 921 days.

(21) Appl. No.: 13/924,676

(22) Filed: Jun. 24, 2013

(65) Prior Publication Data

US 2014/0317427 A1    Oct. 23, 2014

Related U.S. Application Data

(60) Provisional application No. 61/812,777, filed on Apr. 17, 2013.

(51) Int. Cl.
| | |
|---|---|
| G06F 1/32 | (2019.01) |
| G06F 1/3206 | (2019.01) |
| G06F 1/324 | (2019.01) |
| G06F 1/3296 | (2019.01) |
| G06F 1/3203 | (2019.01) |

(52) U.S. Cl.
CPC ............ *G06F 1/3206* (2013.01); *G06F 1/324* (2013.01); *G06F 1/3296* (2013.01); *G06F 1/3203* (2013.01); *Y02D 10/126* (2018.01); *Y02D 10/172* (2018.01)

(58) Field of Classification Search
CPC .... G06F 1/3234; G06F 1/3206; G06F 1/3296; Y02D 10/126; Y02D 10/172
USPC ......................................................... 713/322
See application file for complete search history.

(56) References Cited

U.S. PATENT DOCUMENTS

| | | |
|---|---|---|
| 7,146,513 B2 | 12/2006 | Misaka et al. |
| 7,376,848 B2 | 5/2008 | Beard |
| 7,802,120 B2 | 9/2010 | Conroy et al. |
| 8,381,004 B2 * | 2/2013 | Elnozahy et al. ............ 713/321 |
| 9,063,730 B2 * | 6/2015 | Dighe et al. |

(Continued)

*Primary Examiner* — Volvick Derose
(74) *Attorney, Agent, or Firm* — W&T/Qualcomm (57) ABSTRACT

Dynamic clock voltage scaling (DCVS) based on application performance in a system-on-a-chip (SOC), and related methods and processor-based systems are disclosed. In this regard, in one embodiment, a method of providing an application-specific DCVS in a SOC is provided. The method comprises receiving performance data corresponding to at least one performance characteristic of a SOC indicative of an execution performance of an application executing on the SOC. The method also comprises storing the performance data for the application executing on the SOC. The method further comprises, responsive to executing the application on the SOC, determining an application-specific DCVS setting for the application based on the performance data, and setting a DCVS parameter of the SOC based on the determined application-specific DCVS setting for the application. In this manner, an optimal DCVS setting is provided for the SOC to optimize computing resources, thus improving perceived performance of the application.

14 Claims, 9 Drawing Sheets

(56) References Cited

U.S. PATENT DOCUMENTS

| | | | |
|---|---|---|---|
| 2004/0025069 A1* | 2/2004 | Gary et al. | 713/300 |
| 2004/0054942 A1* | 3/2004 | Shoaib | H04L 41/06 |
| | | | 714/1 |
| 2005/0132238 A1* | 6/2005 | Nanja | 713/300 |
| 2008/0005736 A1* | 1/2008 | Apacible | G06F 9/4843 |
| | | | 718/100 |
| 2008/0276105 A1* | 11/2008 | Hoberman | G06F 1/3203 |
| | | | 713/300 |
| 2008/0307240 A1 | 12/2008 | Dahan et al. | |
| 2009/0049314 A1* | 2/2009 | Taha | G06F 1/3203 |
| | | | 713/300 |
| 2009/0210654 A1* | 8/2009 | Koul | G06F 1/3203 |
| | | | 712/25 |
| 2010/0145643 A1* | 6/2010 | Katpelly | G06F 1/3203 |
| | | | 702/63 |
| 2010/0146316 A1* | 6/2010 | Carter et al. | 713/322 |
| 2010/0162216 A1* | 6/2010 | Bell, Jr. | G06F 11/3419 |
| | | | 717/128 |
| 2010/0287396 A1* | 11/2010 | Barth | G06F 1/3228 |
| | | | 713/323 |
| 2010/0295852 A1* | 11/2010 | Yang | G06F 1/3203 |
| | | | 345/426 |
| 2011/0004575 A1* | 1/2011 | Yang | G06F 1/3203 |
| | | | 706/12 |
| 2011/0046804 A1* | 2/2011 | Fong | G06F 1/206 |
| | | | 700/291 |
| 2012/0081378 A1* | 4/2012 | Roy | G06T 15/005 |
| | | | 345/522 |
| 2012/0159496 A1 | 6/2012 | Dighe et al. | |
| 2012/0166636 A1* | 6/2012 | Page | G06F 11/3409 |
| | | | 709/224 |
| 2013/0046967 A1* | 2/2013 | Fullerton | H03K 3/0315 |
| | | | 713/100 |
| 2013/0139170 A1* | 5/2013 | Prabhakar et al. | 718/104 |
| 2013/0148531 A1* | 6/2013 | Moisan | H04L 41/5009 |
| | | | 370/252 |
| 2013/0198366 A1* | 8/2013 | Branson | H04L 43/08 |
| | | | 709/224 |
| 2014/0101420 A1 | 4/2014 | Wu | |
| 2014/0215253 A1* | 7/2014 | Klassen | G06F 1/3206 |
| | | | 713/340 |
| 2014/0298041 A1* | 10/2014 | Consalus | G06F 21/602 |
| | | | 713/193 |
| 2015/0286551 A1* | 10/2015 | Tepus | G06F 11/3419 |
| | | | 717/127 |

* cited by examiner

| | Per-application log (50) | | | |
|---|---|---|---|---|
| 158(1) — | application event | $F_{current}$ | $F_{desired}$ | Duration |
| 158(2) — | application event | $F_{current}$ | $F_{desired}$ | Duration |
| | ... | ... | ... | ... |
| 158(M) — | application event | $F_{current}$ | $F_{desired}$ | Duration |

*FIG. 7*

Per-Application DCVS Settings Database (70)

| | application event | $T_{exceed}$ | $F_{max}$ | $T_{reduce}$ | $F_{baseline}$ |
|---|---|---|---|---|---|
| 160(1) | application event | $T_{exceed}$ | $F_{max}$ | $T_{reduce}$ | $F_{baseline}$ |
| 160(2) | application event | $T_{exceed}$ | $F_{max}$ | $T_{reduce}$ | $F_{baseline}$ |
| | ... | ... | | | |
| 160(N) | application event | $T_{exceed}$ | $F_{max}$ | $T_{reduce}$ | $F_{baseline}$ |

DYNAMIC CLOCK VOLTAGE SCALING (DCVS) BASED ON APPLICATION PERFORMANCE IN A SYSTEM-ON-A-CHIP (SOC), AND RELATED METHODS AND PROCESSOR-BASED SYSTEMS

PRIORITY CLAIM

The present application claims priority to U.S. Provisional Patent Application Ser. No. 61/812,777 filed on Apr. 17, 2013, and entitled "DYNAMIC CLOCK VOLTAGE SCALING (DCVS) BASED ON APPLICATION PERFORMANCE IN A SYSTEM-ON-A-CHIP (SOC), AND RELATED PROCESSORS, PROCESSOR-BASED SYSTEMS, AND METHODS," which is incorporated herein by reference in its entirety.

BACKGROUND

I. Field of the Disclosure

The technology of the disclosure relates to dynamic clock voltage scaling (DCVS) in processors in processor-based systems.

II. Background

A synchronous digital circuit, such as a central processing unit (CPU) or a digital signal processor (DSP), for example, requires a clock signal to coordinate timing of logic in the circuit. A frequency of the clock signal controls a switching speed or rate of the logic, and thus the performance of the circuit. A relationship exists between a clock frequency of the circuit and a voltage level powering the circuit. An increase in the clock frequency causes a corresponding increase in a minimum voltage level required to power the circuit for proper operation. Accordingly, an increase in clock frequency generally results in increased power consumption. Power consumption of the circuit can be decreased by lowering the voltage level. However, a reduction in voltage level decreases a maximum clock frequency possible for the circuit. The voltage level can be reduced until a minimum threshold voltage level necessary for proper operation of the circuit at a desired clock frequency is reached.

To optimize power consumption while still providing acceptable performance, dynamic clock voltage scaling (DCVS) circuits can be employed in processor-based electronic devices, including user-based portable electronic devices. DCVS circuits control clock frequency and voltage level settings by predicting optimal clock frequency and voltage settings for a processor and/or other synchronously clocked components based on performance demands of the electronic device. In this manner, DCVS circuits may optimize power consumption required for a demanded performance level. Additional information such as temperature, operating system (OS) scheduler state, and battery level can also be used to influence the operation of DCVS circuits.

However, in some circumstances, when a DCVS circuit for an electronic device increases a clock frequency and/or voltage level of a synchronous digital circuit in response to an increased performance demand, the increased performance demand may have already been present for some period of time. This may result in a user perception of slow responsiveness by the electronic device during periods of increased performance demand.

SUMMARY OF THE DISCLOSURE

Embodiments disclosed herein include dynamic clock voltage scaling (DCVS) based on application performance in a system-on-a-chip (SOC). Related methods and processor-based systems are also disclosed. In some embodiments, DCVS functionality is provided by an application-specific DCVS circuit of the SOC. The application-specific DCVS circuit uses locally monitored and/or crowd-sourced performance data of the SOC while an application is executing on the SOC. The performance data of the SOC monitored during execution of the application is used to generate a performance profile specific to the application. When the application is launched for execution on the SOC, the application-specific DCVS circuit uses the performance data and/or the performance profile for the application to determine DCVS settings to be set by the DCVS circuit in the SOC. In this manner, an optimal DCVS setting for performance and power consumption is provided for the SOC to optimize computing resources provided to execute the SOC, and thereby improve perceived performance of the application when executing on the SOC.

In this regard, in one embodiment, a method of providing an application-specific DCVS in a SOC is provided. The method comprises receiving performance data corresponding to at least one performance characteristic of a SOC indicative of an execution performance of an application executing on the SOC. The method also comprises storing the performance data for the application executing on the SOC. The method further comprises, responsive to executing the application on the SOC, determining an application-specific DCVS setting for the application based on the performance data, and setting a DCVS parameter of the SOC based on the determined application-specific DCVS setting for the application.

In another embodiment, an application-specific DCVS circuit in a SOC is provided. The application-specific DCVS circuit comprises a data gathering agent and an application monitoring agent. The data gathering agent is configured to receive performance data corresponding to at least one performance characteristic of a SOC indicative of an execution performance of an application executing on the SOC. The data gathering agent is also configured to store the performance data for the application executing on the SOC. The application monitoring agent is configured to detect execution of the application on the SOC. The application monitoring agent is further configured to, responsive to detecting execution of the application on the SOC, determine an application-specific DCVS setting for the application based on the performance data, and set a DCVS parameter of the SOC based on the determined application-specific DCVS setting for the application.

In another embodiment, an application-specific DCVS circuit in a SOC is provided. The application-specific DCVS circuit comprises a means for receiving performance data corresponding to at least one performance characteristic of a SOC indicative of an execution performance of an application executing on the SOC. The application-specific DCVS circuit further comprises a means for storing the performance data for the application executing on the SOC. The application-specific DCVS circuit also comprises a means for determining an application-specific DCVS setting for the application based on the performance data responsive to executing the application on the SOC. The application-specific DCVS circuit additionally comprises a means for setting a DCVS parameter of the SOC based on the determined application-specific DCVS setting for the application.

DETAILED DESCRIPTION

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed herein include dynamic clock voltage scaling (DCVS) based on application performance in a system-on-a-chip (SOC). Related methods and processor-based systems are also disclosed. In some embodiments, DCVS functionality is provided by a DCVS circuit in the SOC. The DCVS circuit uses individually monitored and/or crowd-sourced performance data of the SOC while an application is executing on the SOC. The performance data of the SOC monitored during execution of the application is used to generate a DCVS profile specific to the application. When the application is launched for execution on the SOC, the DCVS profile for the application is used to determine DCVS settings to be set by the DCVS circuit in the SOC. In this manner, an optimal DCVS setting for performance and power consumption is provided for the SOC to optimize computing resources provided to execute the application on the SOC, and thereby improve the perceived performance of the application when executing on the SOC.

In this regard, in one embodiment, a method of providing an application-specific DCVS in a SOC is provided. The method comprises receiving performance data corresponding to at least one performance characteristic of a SOC indicative of an execution performance of an application executing on the SOC. The method also comprises storing the performance data for the application executing on the SOC. The method further comprises, responsive to executing the application on the SOC, determining an application-specific DCVS setting for the application based on the performance data, and setting a DCVS parameter of the SOC based on the determined application-specific DCVS setting for the application.

Figure 1:
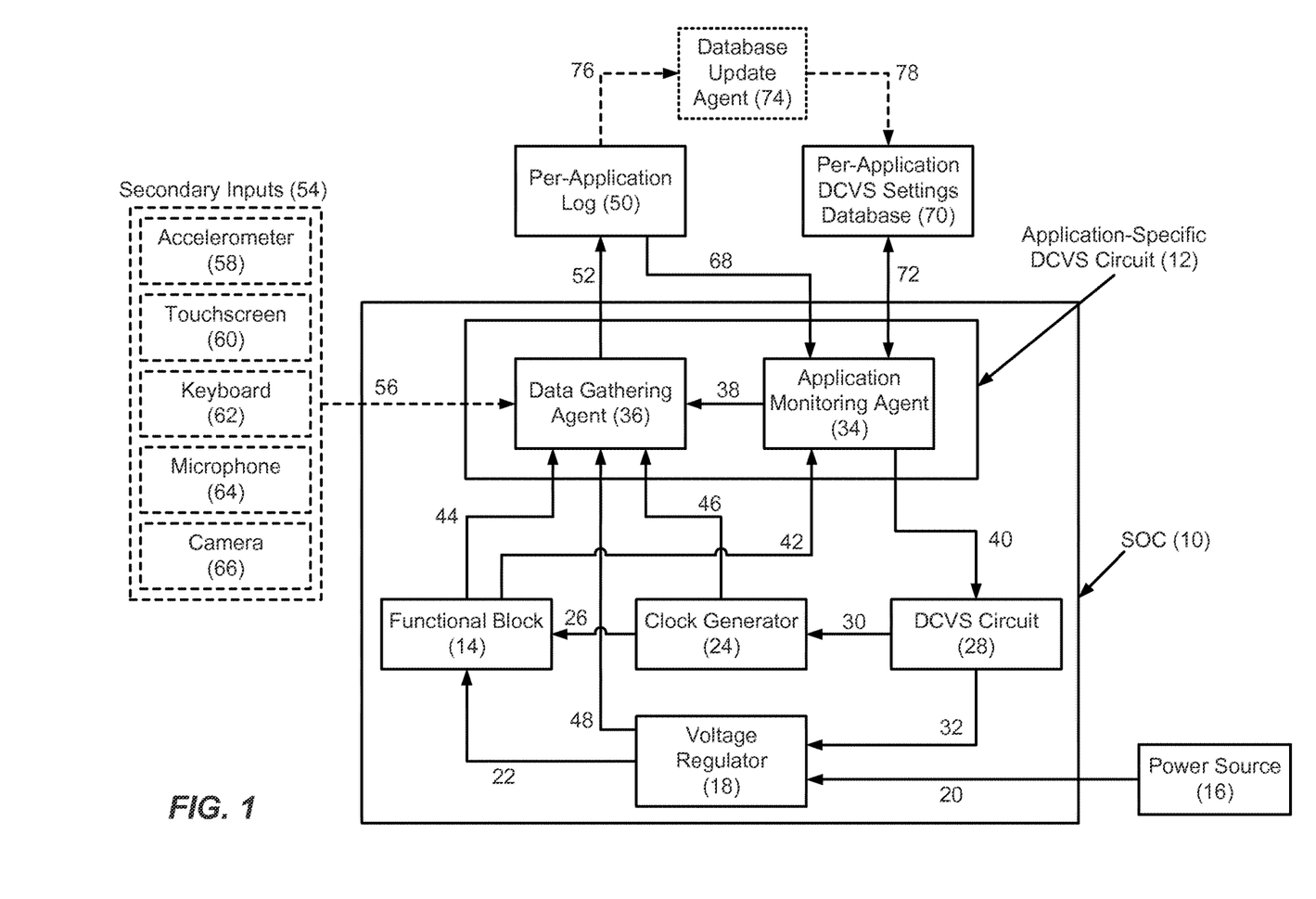
FIG. 1 is a block diagram of exemplary components provided in a system-on-a-chip (SOC), including an application-specific dynamic clock voltage scaling (DCVS) circuit configured to provide application-specific DCVS settings for a functional block of the SOC.

To illustrate elements of an exemplary SOC 10 including an application-specific DCVS circuit 12, FIG. 1 is provided. The SOC 10 of FIG. 1 may be integrated on a semiconductor die or package (not shown), and comprises an application-specific DCVS circuit 12. The SOC 10 further includes a functional block 14, which may encompass one or more (or a combination of one or more) known digital logic elements, semiconductor circuits, processing cores, and/or memory structures, among other elements. The SOC 10 is connected to a power source 16, which supplies voltage to a voltage regulator 18 as indicated by arrow 20. The voltage regulator 18 in turn converts the voltage received from the power source 16 into an appropriate voltage to power the functional block 14, as shown by arrow 22. The voltage output of the voltage regulator 18 may be determined such that it meets minimum voltage value requirements of the functional block 14. As is known in the art, one method of determining the minimum voltage requirements may be based on minimum voltage required to support a specified clock frequency of the functional block 14.

A clock generator 24 supplies clock pulses (represented by arrow 26) at specified clock frequencies to the functional block 14 for executing computational tasks. In some embodiments, the clock frequency of the clock generator 24 may be based on an external reference clock source (not shown), such as a front side bus (FSB) clock, wherein the clock frequency of the clock generator 24 results from multiplying the reference clock source by a given clock multiplier. In other embodiments, the clock generator 24 may generate clock pulses independent of other internal and/or external clock sources. The clock frequency of the clock generator 24 may be modified to provide a lower or higher clock frequency to the functional block 14. It is to be understood that a maximum clock frequency that may be provided by the clock generator 24 to the functional block 14 is dependent upon the voltage supplied to the functional block 14 by the voltage regulator 18, wherein a higher supply voltage may support a higher clock frequency.

With continuing reference to FIG. 1, a DCVS circuit 28 of the SOC 10 attempts to optimize power consumption of the functional block 14 while maintaining acceptable performance levels. To do so, the DCVS circuit 28 may predict optimal clock frequency and voltage settings for the functional block 14 based on performance demands to optimize power consumption for a demanded performance level. In some embodiments, the DCVS circuit 28 may take into consideration additional data such as temperature, operating system (OS) scheduler states, and battery level when determining optimal clock frequency and voltage settings for the functional block 14. Based on the determined optimal clock frequency and voltage settings, the DCVS circuit 28 generates control signals to the clock generator 24 and the voltage regulator 18, as indicated by arrows 30 and 32, respectively.

In the illustrated embodiment, the application-specific DCVS circuit 12, the voltage regulator 18, the clock generator 24, and the DCVS circuit 28 are shown corresponding to the functional block 14. However, it will be understood that the configuration shown in FIG. 1 is for illustrative purposes only. In some embodiments a single application-specific DCVS circuit 12, voltage regulator 18, clock generator 24, and/or DCVS circuit 28 may be shared between more than one functional block 14. Some embodiments may provide that the SOC 10 includes more than one application-specific DCVS circuit 12, voltage regulator 18, clock generator 24, and/or DCVS circuit 28 corresponding to more than one functional block 14.

Under some circumstances, the time required for the DCVS circuit 28 to detect and respond to a change in a demanded performance level may result in a user perception of application unresponsiveness or slow device performance. In this regard, the application-specific DCVS circuit 12 of FIG. 1 provides application-specific DCVS settings to optimize the performance of the functional block 14 based on an application being executed by the SOC 10. The application-specific DCVS circuit 12 includes an application monitoring agent 34 and a data gathering agent 36. The application monitoring agent 34 detects changes in a state of an executing application, such as an application startup or shutdown. In response to detecting an application state change, the application monitoring agent 34 generates and sends an application event to the data gathering agent 36 as indicated by arrow 38. The application monitoring agent 34 also generates new DCVS settings to provide to the DCVS circuit 28 as shown by arrow 40. In some embodiments, the application monitoring agent 34 may receive a notification of a pre-defined application state change (e.g., application startup or shutdown) from the functional block 14 as indicated by arrow 42. Some embodiments may provide that the application state change may be generated at periodic intervals by a timer (not shown).

During execution of an application, the data gathering agent 36 of the application-specific DCVS circuit 12 monitors performance characteristics of the functional block 14 (indicated by arrow 44) of the SOC 10 as it waits to receive an application event from the application monitoring agent 34. The monitored performance characteristics may include any type and/or number of performance characteristics relating to the SOC 10 and/or its constituent elements. Non-limiting examples of a monitored performance characteristic include a state of a processor task queue, a processor idle time, a cache usage statistic (e.g., cache hits and/or misses), user feedback, network on chip (NOC) latency, or NOC queue depth, or combinations thereof.

The data gathering agent 36 further monitors the status of the clock generator 24 (as indicated by arrow 46) and the voltage regulator 18 (as shown by arrow 48). Based on the performance characteristics of the functional block 14 and the status of the clock generator 24 and the voltage regulator 18, the data gathering agent 36 estimates whether computing resources (e.g., clock frequency and voltage) being supplied to the functional block 14 meet or exceed the performance demands of the executing application. Upon receiving an application event from the application monitoring agent 34, the data gathering agent 36 stores performance data corresponding to the monitored performance characteristic to a per-application log 50 (as indicated by arrow 52). Additional data, such as an estimate of optimal computing resources corresponding to the most recent application event, may also be stored in the per-application log 50 by the data gathering agent 36. The per-application log 50 may contain only one entry for an application event, or may include a rolling list of entries. An exemplary structure of the per-application log 50 in some embodiments is illustrated in greater detail in FIG. 7, discussed below.

In some embodiments, the per-application log 50 may be stored locally (i.e., as part of the same electronic device as the SOC 10). Such a per-application log 50 may contain performance data for an application executing locally on the functional block 14 of the SOC 10. Some embodiments may provide that the per-application log 50 is stored remotely (i.e., "cloud" based), and is accessed via a public network, such as the Internet or via a private network. A cloud-based per-application log 50 may include crowd-sourced performance data for an application executing on other devices besides the functional block 14 of the SOC 10.

In addition to monitoring the operation of the functional block 14, the data gathering agent 36 may also receive secondary inputs 54 (as indicated by arrow 56). The secondary inputs 54 may include, by way of example, inputs from an accelerometer 58, a touchscreen 60, a keyboard 62, a microphone 64, and/or a camera 66. The secondary inputs 54 may provide the data gathering agent 36 with other indicia relating to a user's perception of application performance. For example, a user may express frustration with perceived slow application performance by shaking the device (which generates input from the accelerometer 58) or by tapping the touchscreen 60 or keyboard 62. In this manner, the data gathering agent 36 may detect an increased demand for application performance based on user input.

As noted above, when the application monitoring agent 34 detects a change in a state of an application, it may generate new DCVS settings and provide the new DCVS settings to the DCVS circuit 28. In some embodiments, the application monitoring agent 34 may generate the new DCVS settings by analyzing performance data in the per-application log 50 (as indicated by arrow 68). The application monitoring agent 34 then generates new DCVS settings based on the performance data, and may write the new DCVS settings to a performance profile in a per-application DCVS settings database 70 (as indicated by arrow 72). Some embodiments may provide that the application monitoring agent 34 may generate the new DCVS settings by reading the DCVS settings from a previously stored performance profile in the per-application DCVS settings database 70.

In some embodiments, the per-application DCVS settings database 70 may be stored locally (i.e., as part of the same electronic device as the SOC 10). Such a per-application DCVS settings database 70 may contain a performance profile for an application executing locally on the functional block 14 of the SOC 10. Some embodiments may provide that the per-application DCVS settings database 70 is stored remotely (i.e., "cloud" based), and is accessed via a public network, such as the Internet or via a private network. A cloud-based per-application DCVS settings database 70 may include a crowd-sourced performance profile for an application executing on other devices besides the functional block 14 of the SOC 10.

In some embodiments, a database update agent 74 may be provided to initiate an update of the per-application DCVS settings database 70. The database update agent 74 may be configured to update the per-application DCVS settings database 70 periodically at set intervals, or may update the per-application DCVS settings database 70 on demand. In updating the per-application DCVS settings database 70, the database update agent 74 may analyze the performance data stored in the per-application log 50 (indicated by arrow 76), and update the performance profile stored in the per-application DCVS settings database 70 based on the analysis (indicated by arrow 78).

Figure 2:
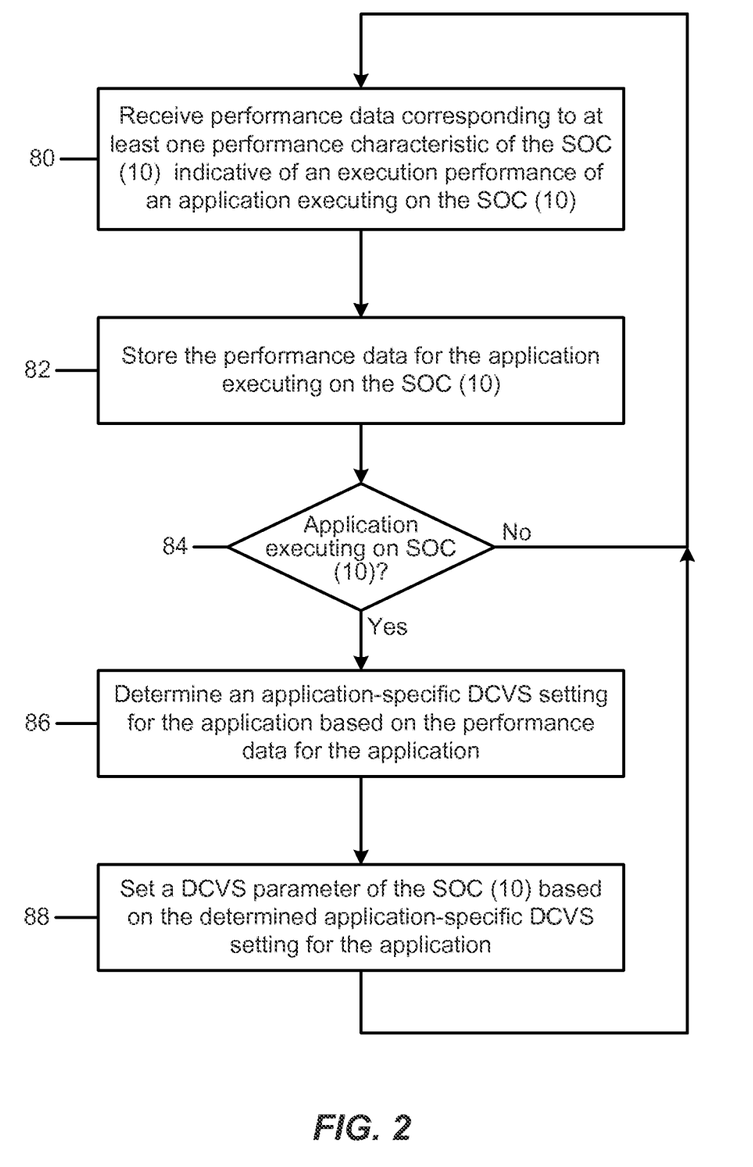
FIG. 2 is a flowchart illustrating exemplary operations for providing DCVS based on application performance in a SOC.

FIG. 2 is provided to illustrate exemplary operations for providing DCVS based on application performance on the SOC 10 by an application-specific DCVS circuit 12. For the sake of clarity, the description of FIG. 2 refers to elements of the SOC 10 of FIG. 1. In FIG. 2, processing begins with the application-specific DCVS circuit 12 receiving performance data corresponding to at least one performance characteristic of the SOC 10 indicative of an execution performance of an application executing on the SOC 10

(block 80). In some embodiments, the performance data may be received by the data gathering agent 36 of the application-specific DCVS circuit 12. The at least one performance characteristic may include any type and/or number of performance characteristics relating to the SOC 10 and/or its constituent elements. Non-limiting examples of a monitored performance characteristic include a state of a processor task queue, a processor idle time, a cache usage statistic (e.g., cache hits and/or misses), user feedback, network on chip (NOC) latency, or NOC queue depth, or combinations thereof.

The application-specific DCVS circuit 12 then stores the performance data for the application executing on the SOC 10 (block 82). Some embodiments provide that the performance data is stored in a per-application log 50 by the data gathering agent 36 of FIG. 1. The application-specific DCVS circuit 12 then detects whether an application is currently executing on the SOC 10 (block 84). If not, processing resumes at block 80. If execution of an application on the SOC 10 is detected at decision block 84 of FIG. 2, the application-specific DCVS circuit 12 determines an application-specific DCVS setting for the application based on the performance data (block 86). In some embodiments, the application-specific DCVS setting may be determined based on an analysis of performance data stored in the per-application log 50. Some embodiments may provide that the application-specific DCVS setting is based on a performance profile stored in the per-application DCVS settings database 70 of FIG. 1.

The application-specific DCVS circuit 12 next sets a DCVS parameter of the SOC 10 based on the determined application-specific DCVS setting for the application (block 88). Setting a DCVS parameter of the SOC 10 may include providing the determined application-specific DCVS setting to the DCVS circuit 28 of the SOC 10. The DCVS circuit 28 may then adjust a clock frequency generated by the clock generator 24 and/or a voltage level generated by the voltage regulator 18 based on the determined application-specific DCVS setting provided by the application-specific DCVS circuit 12. The performance of the SOC 10 is thus optimized for the currently executing application. Processing then resumes at block 80.

Figure 3:
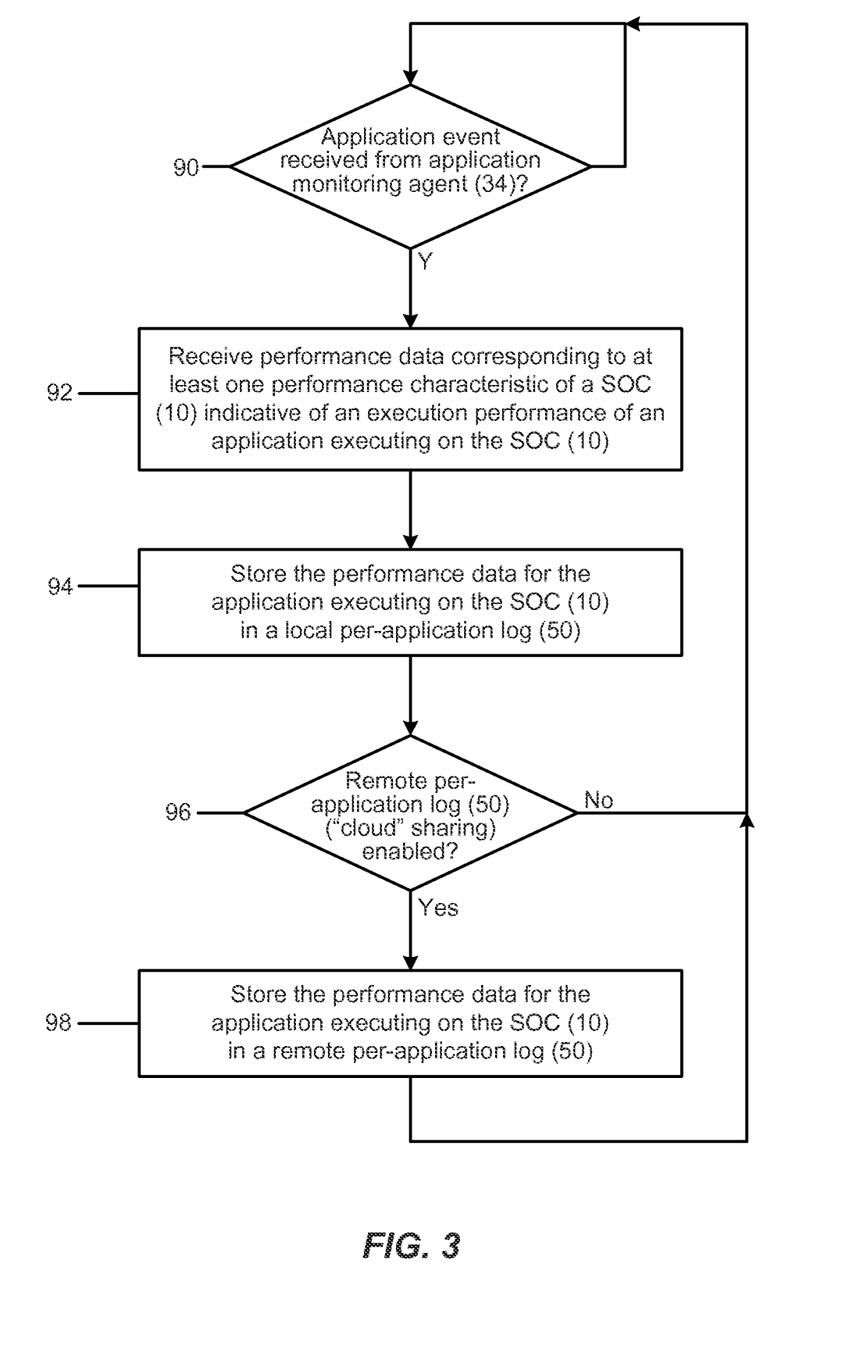
FIG. 3 is a flowchart illustrating exemplary operations for a data gathering agent of an application-specific DCVS circuit.

To illustrate more detailed exemplary operations for the data gathering agent 36 of the application-specific DCVS circuit 12, FIG. 3 is provided, with reference to FIG. 1. In this example, operations begin with the data gathering agent 36 determining whether an application event has been received from the application monitoring agent 34 of the application-specific DCVS circuit 12 (block 90). If not, processing then returns to block 90. If the data gathering agent 36 determines at block 90 that an application event has been received, the data gathering agent 36 receives performance data corresponding to at least one performance characteristic of the SOC 10 indicative of execution performance (block 92). The at least one performance characteristic may include any type and/or number of performance characteristics relating to the SOC 10 and/or its constituent elements. Non-limiting examples of a monitored performance characteristic include a state of a processor task queue, a processor idle time, a cache usage statistic (e.g., cache hits and/or misses), user feedback, network on chip (NOC) latency, or NOC queue depth, or combinations thereof.

The data gathering agent 36 then stores the performance data for the application executing on the SOC 10 in a local per-application log, such as the per-application log 50 of FIG. 1 (block 94). The data gathering agent 36 determines whether a remote per-application log 50 (i.e., "cloud" sharing of performance data) is enabled (block 96). In some embodiments, a remote per-application log 50 may include crowd-sourced performance data for the executing application, which may provide a more extensive set of performance data points on which to base application-specific DCVS settings. If a remote per-application log 50 is not enabled, processing continues at block 90. If the data gathering agent 36 determines at block 96 that a remote per-application log 50 is enabled, the data gathering agent 36 sends the performance data to the remote per-application log 50 (block 98). Processing then resumes at block 90 of FIG. 3.

Figure 4:
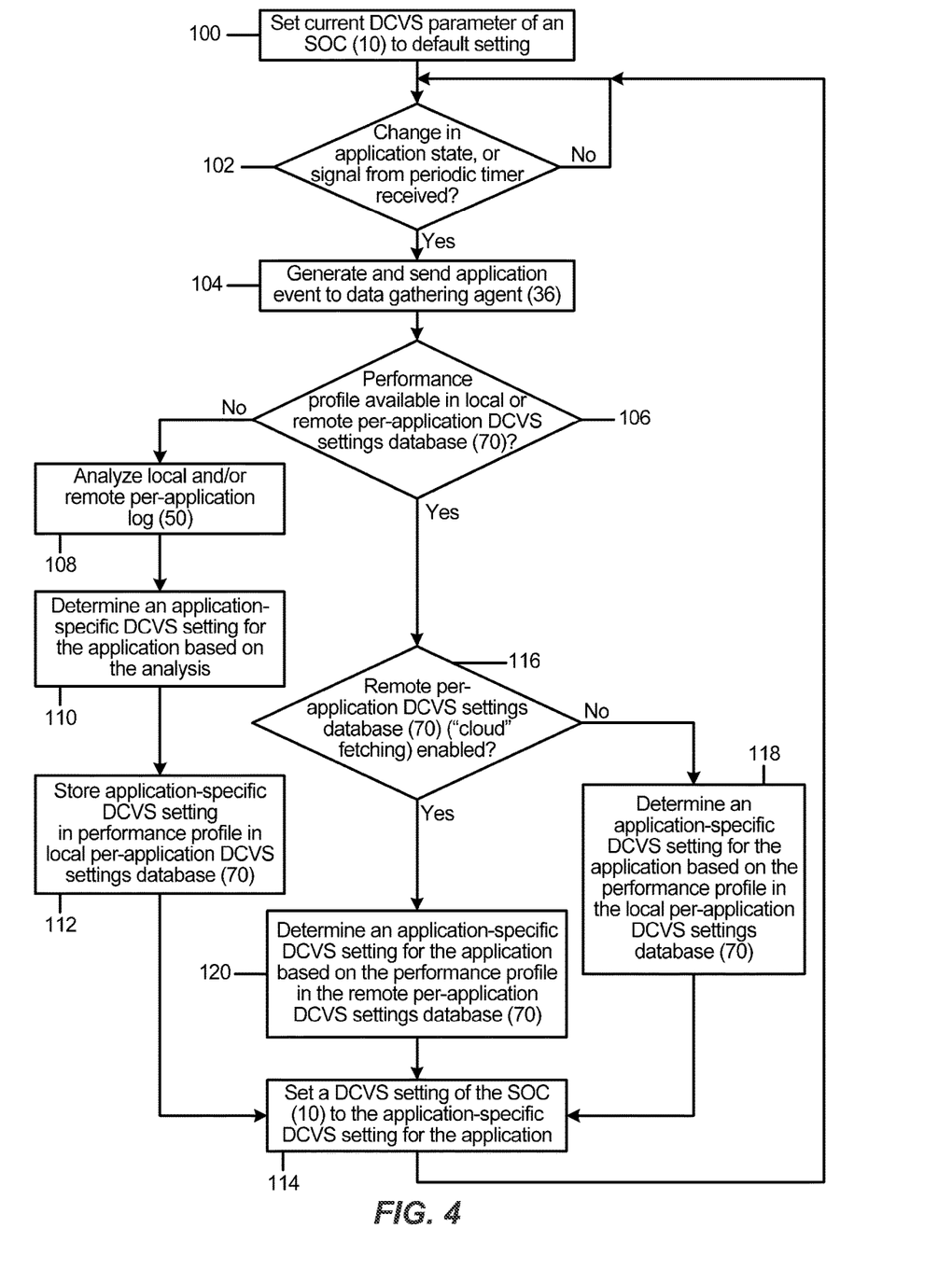
FIG. 4 is a flowchart showing exemplary operations for an application monitoring agent of an application-specific DCVS circuit.

As noted above, the data gathering agent 36 may receive an application event from the application monitoring agent 34 of FIG. 1. To illustrate exemplary detailed operations for the application monitoring agent 34, FIG. 4 is provided, with reference to FIG. 1. In FIG. 4, operations begin with the application monitoring agent 34 setting a current DCVS parameter for the SOC 10 to a default setting (block 100). For example, the application monitoring agent 34 may instruct the DCVS circuit 28 of the SOC 10 to revert to a default setting. The application monitoring agent 34 next determines whether either a change in a state of an executing application or a signal from a periodic timer has been received (block 102). If not, processing returns to block 102 as the application monitoring agent 34 waits for either a change in the state of the executing application or a signal from the periodic timer. If the application monitoring agent 34 determines at block 102 of FIG. 4 that an application state change has been detected or a periodic timer signal has been received, the application monitoring agent 34 generates an application event and sends it to the data gathering agent 36 of FIG. 1 (block 104). Sending the application event to the data gathering agent 36 triggers the operations of the data gathering agent 36 discussed above with respect to FIG. 3.

The application monitoring agent 34 next determines whether a performance profile for the currently executing application is available in a local or remote per-application DCVS settings database 70 (block 106). If no performance profile is available in a per-application DCVS settings database 70, the application monitoring agent 34 will generate application-specific DCVS settings based on available performance data for the application. The application monitoring agent 34 analyzes a local and/or a remote per-application log, such as the per-application log 50 of FIG. 1 (block 108). Based on the analysis, the application monitoring agent 34 determines an application-specific DCVS setting for the application (block 110). The application monitoring agent 34 then stores the application-specific DCVS setting in a performance profile in a local per-application DCVS settings database, such as the per-application DCVS settings database 70 of FIG. 1 (block 112). In this manner, the application-specific DCVS setting may be retrieved and applied by the application monitoring agent 34 in response to a future change in application state. The application monitoring agent 34 sets a DCVS parameter of the SOC 10 to the application-specific DCVS setting for the application (block 114). Processing then resumes at block 102.

Returning to decision block 106 of FIG. 4, if the application monitoring agent 34 determines that a performance profile is available in a per-application DCVS settings database 70, the application monitoring agent 34 checks whether a remote per-application DCVS settings database 70 (i.e., "cloud" fetching) is enabled (block 116). If not, the application monitoring agent 34 determines an application-specific DCVS setting for the application based on the performance profile for the application in a local per-application DCVS settings database 70 (block 118). If a remote per-application DCVS settings database 70 is enabled, the application monitoring agent 34 determines an application-specific DCVS setting for the application based on the performance profile for the application in the remote per-application DCVS settings database 70 (block 120). Once the application-specific DCVS setting for the application is determined (whether based on a local or a remote per-application DCVS settings database 70), the application monitoring agent 34 sets a DCVS parameter of the SOC 10 to the application-specific DCVS setting (block 114). Processing then resumes at block 102.

Figure 5:
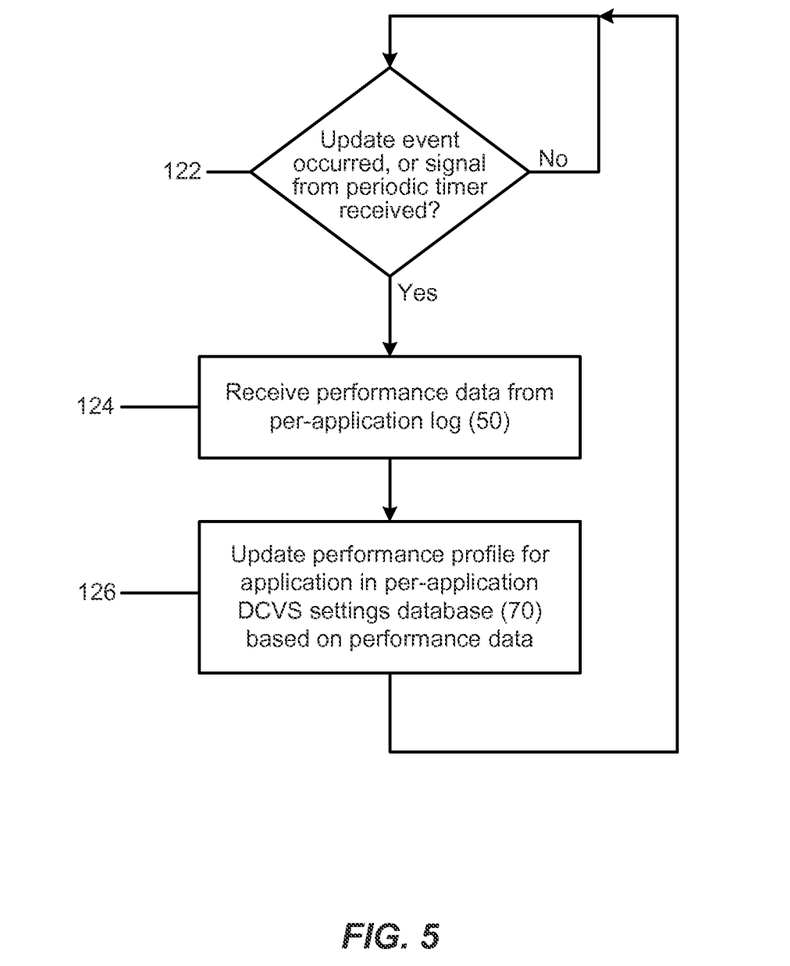
FIG. 5 is a flowchart illustrating exemplary operations for a database update agent of an application-specific DCVS circuit.

As noted above, a database update agent, such as the database update agent 74 of FIG. 1, may be provided to analyze performance data stored in a per-application log 50, and modify a performance profile stored in a per-application DCVS settings database 70. In this regard, FIG. 5 is a flowchart illustrating an exemplary operation flow for updating a per-application DCVS settings database 70 by the database update agent 74. Operations begin with the database update agent 74 determining whether an update event has occurred, or whether a signal from a periodic timer (not shown) has been received (block 122). If not, processing resumes at block 122 as the database update agent 74 waits for an update event to be received, or for a periodic timer to initiate an update. If the database update agent 74 detects an update event or a periodic timer signal, the database update agent 74 receives performance data from a per-application performance log, such as the per-application log 50 of FIG. 1 (block 124). The database update agent 74 then updates a performance profile for a corresponding application in the per-application DCVS settings database 70 based on the performance data (block 126). Processing then resumes at block 122.

Figure 6:
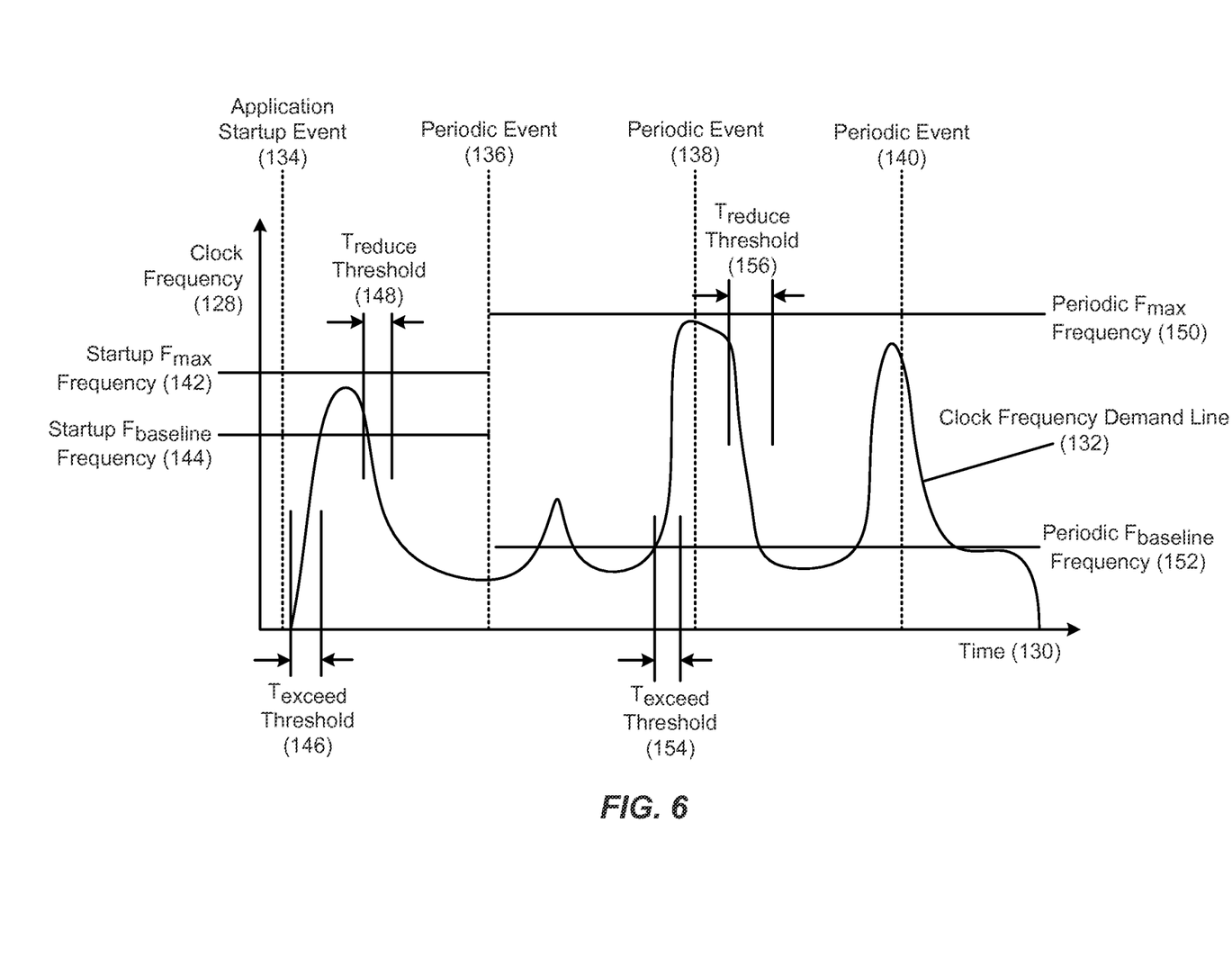
FIG. 6 is a graph illustrating application events and corresponding variations in a performance level demanded by an application executing on a SOC over time.

To illustrate application state changes and corresponding variations in performance level demanded by an application executing on an SOC (such as the SOC 10 of FIG. 1) over time, FIG. 6 is provided. For the sake of clarity, the description of FIG. 6 refers to elements shown in FIG. 1. In this example, the performance level represented in FIG. 6 is a clock frequency demanded by the executing application. However, in some embodiments, the performance level may correspond to other performance characteristics or a combination of performance characteristics that impact application execution, such as voltage levels, network accesses, bus read/writes, or cache reads/writes, among others.

FIG. 6 includes a clock frequency axis 128 represented by a vertical arrow, and a time axis 130 represented by a horizontal arrow. The variation in the clock frequency demanded by the executing application over time is indicated by a clock frequency demand line 132. Also shown in the graph of FIG. 6 are dotted vertical lines representing application events, including an application startup event 134 followed by periodic events 136, 138, and 140. Each application event may be generated by an application monitor, such as the application monitoring agent 34 of FIG. 1, in response to detected changes in a state of the executing application.

As seen in FIG. 6, the clock frequency demand line 132 indicates that the application tends to require significant processing power upon startup. Thus, when the application monitoring agent 34 detects that execution of the application has begun, it generates the application startup event 134. Based on an analysis of data previously stored in the per-application log 50 and/or the per-application DCVS settings database 70, the application monitoring agent 34 provides two corresponding frequency settings and two time thresholds to a DCVS circuit, such as the DCVS circuit 28 of FIG. 1. The two frequency settings, referred to as startup $F_{max}$ frequency 142 and startup $F_{baseline}$ frequency 144, represent maximum and minimum clock frequencies, respectively, that the DCVS circuit 28 may set for the SOC 10. In this example, the startup $F_{baseline}$ frequency 144 is set relatively high to ensure that the DCVS circuit 28 maintains the clock frequency of the SOC 10 at a sufficiently high level during application startup.

Two time thresholds, $T_{exceed}$ threshold 146 and $T_{reduce}$ threshold 148, specify time intervals that the DCVS circuit 28 may use to more precisely calibrate responsiveness in adjusting the current clock frequency. For example, if the application executing on the SOC 10 requires a higher performance level than is provided by the current clock frequency for a time period greater than the $T_{exceed}$ threshold 146, the DCVS circuit 28 may increase the clock frequency. Conversely, if the application requires a lower performance level (indicated by, for example, more processor idle time) for a time period greater than the $T_{reduce}$ threshold 148, the DCVS circuit 28 may decrease the clock frequency. If the $T_{exceed}$ threshold 146 is smaller than the $T_{reduce}$ threshold 148, the DCVS circuit 28 will be more responsive to increasing the performance level of the SOC 10, and will ramp down the performance level of the SOC 10 more slowly. Conversely, if the $T_{exceed}$ threshold 146 is larger than the $T_{reduce}$ threshold 148, the DCVS circuit 28 will increase the performance level of the SOC 10 more slowly, and will be more sensitive to decreasing the performance level of the SOC 10.

With continuing reference to FIG. 6, as the application continues to execute on the SOC 10, the periodic event 136 is generated by the application monitoring agent 34. At this point, the application monitoring agent 34 provides another set of two corresponding frequency settings (periodic $F_{max}$ frequency 150 and periodic $F_{baseline}$ frequency 152) and two time thresholds ($T_{exceed}$ threshold 154 and $T_{reduce}$ threshold 156) to the DCVS circuit 28. As seen in FIG. 6, the periodic $F_{max}$ frequency 150 and the periodic $F_{baseline}$ frequency 152 define a much larger range of clock frequencies for the DCVS circuit 28 to specify for the SOC 10. The $T_{exceed}$ threshold 154 and the $T_{reduce}$ threshold 156 respectively define maximum periods of time during which the clock frequency demands of the SOC 10 may be above or below the current performance level set by the DCVS circuit 28. As further application execution takes place, periodic events 138 and 140 are generated, at which point the application monitoring agent 34 may make further adjustments to frequency settings and time thresholds (not shown) that are provided to the DCVS circuit 28.

Figure 7:
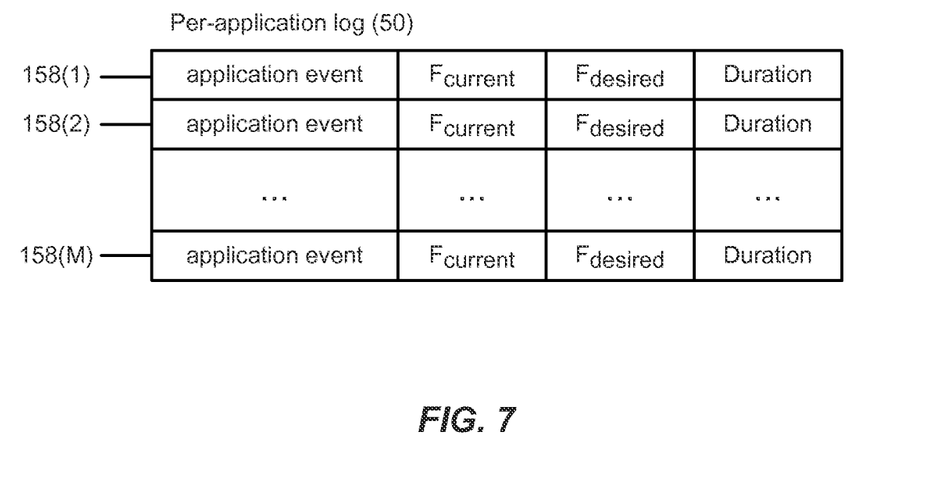
FIG. 7 is a diagram illustrating an exemplary embodiment of a per-application log.

FIG. 7 illustrates an exemplary embodiment of the per-application log 50 of FIG. 1. As seen in FIG. 7, the per-application log 50 in this example is structured as a database table having entries 158(1-M). Each of the entries 158(1-M) comprises an application event field, an $F_{current}$ field, an $F_{desired}$ field, and a Duration field. The entries 158(1-M) may be generated by a data gathering agent, such as the data gathering agent 36 of FIG. 1, in response to detection of application events during execution of an application. Accordingly, the application event field of each of the entries 158(1-M) indicates the type of application event (e.g., application startup or shutdown, or periodic events) corresponding to the entry 158. The $F_{current}$ field of each of the entries 158(1-M) records a clock frequency at which the application is executing at the time the application event was generated. The $F_{desired}$ field of each of the entries 158(1-M) indicates an estimate of an optimal clock frequency to satisfy performance demands of the application at the time the application event was generated. The Duration field of each of the entries 158(1-M) indicates the amount of time elapsed since a previous application event.

Figure 8:
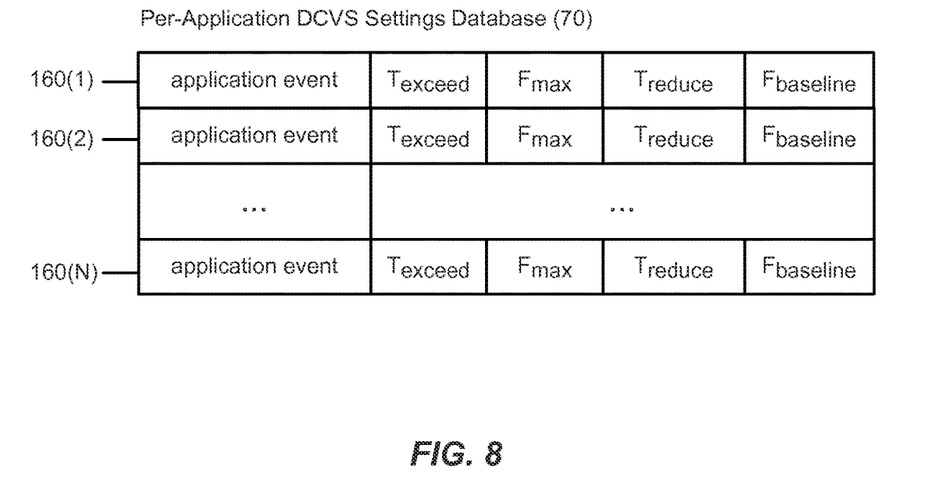
FIG. 8 is a diagram illustrating an exemplary embodiment of a per-application DCVS settings database.

An exemplary embodiment of the per-application DCVS settings database 70 of FIG. 1 is illustrated in FIG. 8. In this example, the per-application DCVS settings database 70 comprises a database table having entries 160(1-N). Each of the entries 160(1-N) includes an application event field, a $T_{exceed}$ field, an $F_{max}$ field, a $T_{reduce}$ field, and an $F_{baseline}$ field. Each of the entries 160(1-N) provides DCVS settings for a corresponding application event. Accordingly, the application event field of each of the entries 160(1-N) indicates the type of application event (e.g., application startup or shutdown, or periodic events) corresponding to the entry 160. The $T_{exceed}$ field, the $F_{max}$ field, the $T_{reduce}$ field, and the $F_{baseline}$ field indicate a $T_{exceed}$ threshold, an $F_{max}$ frequency, a $T_{reduce}$ threshold, and an $F_{baseline}$ frequency, respectively, for the application event. As discussed above with respect to FIG. 6, the $T_{exceed}$ threshold and the $T_{reduce}$ threshold specify time intervals that the DCVS circuit 28 may use to calibrate responsiveness in adjusting a current clock frequency. The $F_{max}$ frequency and the $F_{baseline}$ frequency define a range of clock frequencies for the DCVS circuit 28 to specify for a current clock frequency.

The DCVS based on application performance in a SOC, and related methods and processor-based systems according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 9:
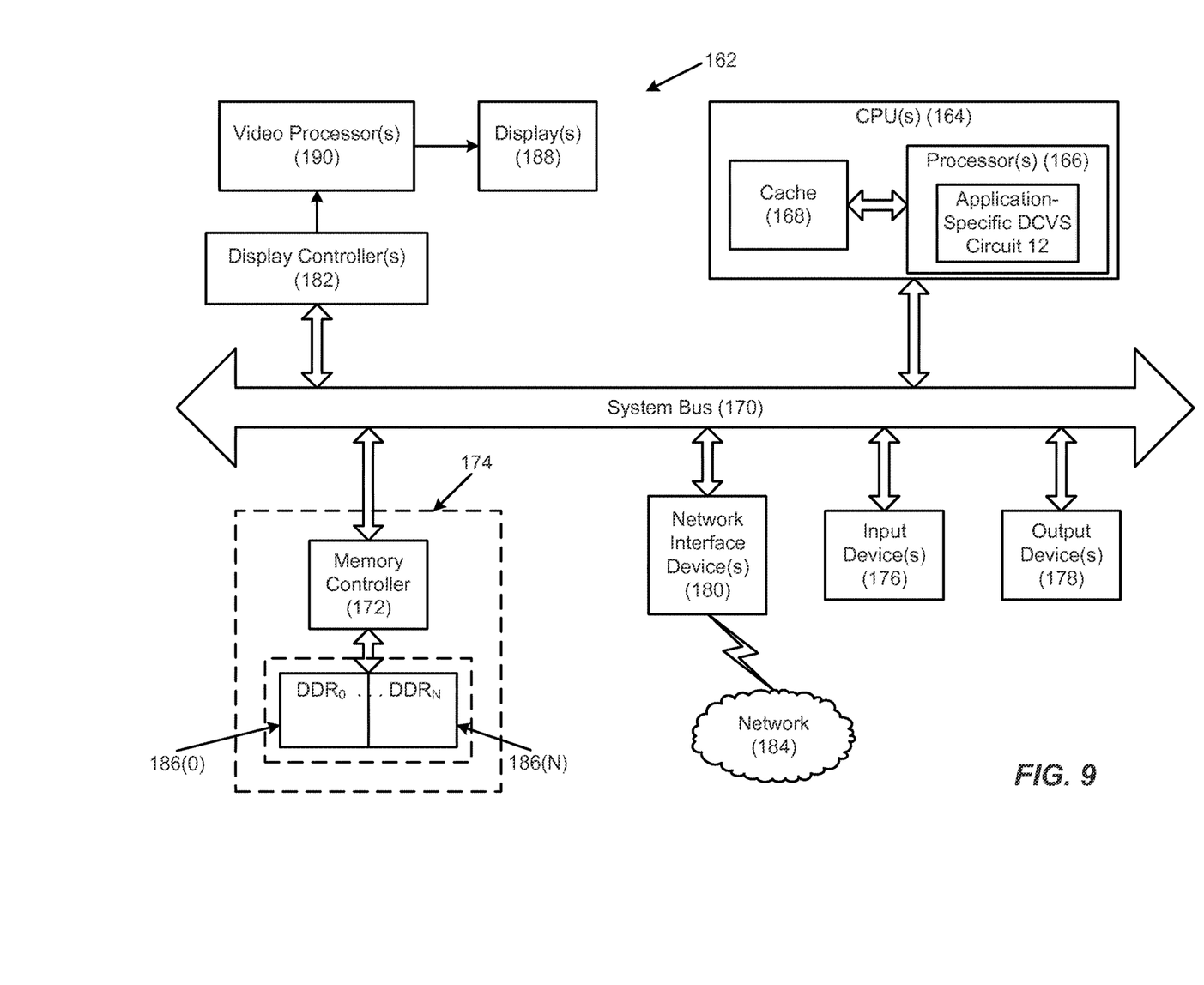
FIG. 9 is a block diagram of an exemplary processor-based system that can include the application-specific DCVS circuit of FIG. 1.

In this regard, FIG. 9 illustrates an example of a processor-based system 162 that can employ the application-specific DCVS circuit 12 illustrated in FIG. 1. In this example, the processor-based system 162 includes one or more central processing units (CPUs) 164, each including one or more processors 166. The CPU(s) 164 may have cache memory 168 coupled to the processor(s) 166 for rapid access to temporarily stored data. The CPU(s) 164 is coupled to a system bus 170 and can intercouple master and slave devices included in the processor-based system 162. As is well known, the CPU(s) 164 communicates with these other devices by exchanging address, control, and data information over the system bus 170. For example, the CPU(s) 164 can communicate bus transaction requests to a memory controller 172 as an example of a slave device.

Other master and slave devices can be connected to the system bus 170. As illustrated in FIG. 9, these devices can include a memory system 174, one or more input devices 176, one or more output devices 178, one or more network interface devices 180, and one or more display controllers 182, as examples. The input device(s) 176 can include any type of input device, including but not limited to input keys, switches, voice processors, etc. The output device(s) 178 can include any type of output device, including but not limited to audio, video, other visual indicators, etc. The network interface device(s) 180 can be any devices configured to allow exchange of data to and from a network 184. The network 184 can be any type of network, including but not limited to a wired or wireless network, a private or public network, a local area network (LAN), a wide local area network (WLAN), and the Internet. The network interface device(s) 180 can be configured to support any type of communication protocol desired. The memory system 174 can include one or more memory units 186(0-N).

The CPU(s) 164 may also be configured to access the display controller(s) 182 over the system bus 170 to control information sent to one or more displays 188. The display controller(s) 182 sends information to the display(s) 188 to be displayed via one or more video processors 190, which process the information to be displayed into a format suitable for the display(s) 188. The display(s) 188 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A processor may be included as part of a CPU or a Graphics Processing Unit (GPU).

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of providing application-specific dynamic clock voltage scaling (DCVS) in a system-on-a-chip (SOC), comprising:
   receiving, in a SOC on an electronic device, crowd-sourced performance data stored outside the electronic device, the crowd-sourced performance data corresponding to at least one execution performance characteristic indicative of an execution performance affecting a perception of a user of responsiveness of an application executing on the SOC;
   storing the crowd-sourced performance data for the application executing on the SOC; and
   responsive to a subsequent execution of the application on the SOC:
      determining an application-specific DCVS setting for the subsequently executed application based on the stored crowd-sourced performance data for the application;
      setting a DCVS parameter of the SOC based on the determined application-specific DCVS setting for the subsequently executed application; and
      storing the application-specific DCVS setting in a performance profile corresponding to the application;
   wherein the application-specific DCVS setting includes a voltage setting or a frequency setting or a combination of a voltage and a frequency setting.

2. The method of claim 1, further comprising launching the application for execution on the SOC,
   wherein determining the application-specific DCVS setting comprises determining a clock frequency signal for the application based on the crowd-sourced performance data after launching the application for execution on the SOC.

3. The method of claim 1, further comprising launching the application for execution on the SOC,
   wherein determining the application-specific DCVS setting comprises determining a voltage setting signal for the application based on the crowd-sourced performance data after launching the application for execution on the SOC.

4. The method of claim 1, wherein determining the application-specific DCVS setting for the application is based on a previously stored application-specific DCVS setting in the performance profile corresponding to the application.

5. The method of claim 1, wherein the at least one execution performance characteristic of the SOC comprises a processor task queue, processor idle time, cache usage, user feedback, network on chip (NOC) latency, or NOC queue depth, or combinations thereof.

6. The method of claim 1 integrated into a semiconductor die.

7. The method of claim 1 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

8. An application-specific dynamic clock voltage scaling (DCVS) circuit in a system-on-a-chip (SOC), comprising:
   a data gathering agent configured to:
      receive, in a SOC on an electronic device, crowd-sourced performance data stored outside the electronic device, the crowd-sourced performance data corresponding to at least one execution performance characteristic indicative of an execution performance affecting a perception of a user of responsiveness of an application executing on the SOC; and
      store the crowd-sourced performance data for the application executing on the SOC;
   an application monitoring agent configured to:
      detect a subsequent execution of the application on the SOC; and
      responsive to detecting the subsequent execution of the application on the SOC:
         determine an application-specific DCVS setting for the subsequently executed application based on the crowd-sourced performance data stored by the data gathering agent for the application;
         set a DCVS parameter of the SOC based on the determined application-specific DCVS setting for the subsequently executed application; and
         store the application-specific DCVS setting in a performance profile corresponding to the application;
   wherein the application-specific DCVS setting includes a voltage setting or a frequency setting or a combination of a voltage and a frequency setting.

9. The application-specific DCVS circuit of claim 8, wherein the SOC is configured to launch the application for execution on the SOC; and
   wherein the application monitoring agent is configured to determine the application-specific DCVS setting by determining a clock frequency signal for the application based on the crowd-sourced performance data after the application is launched for execution on the SOC.

10. The application-specific DCVS circuit of claim 8, wherein the SOC is configured to launch the application for execution on the SOC; and
  wherein the application monitoring agent is configured to determine the application-specific DCVS setting by determining a voltage setting signal for the application based on the crowd-sourced performance data after the application is launched for execution on the SOC.

11. The application-specific DCVS circuit of claim 8, wherein the application monitoring agent is configured to determine the application-specific DCVS setting for the subsequently executed application based on a previously stored application-specific DCVS setting in the performance profile corresponding to the application.

12. The application-specific DCVS circuit of claim 8, wherein the data gathering agent is configured to receive the at least one execution performance characteristic of the SOC indicating a processor task queue, processor idle time, cache usage, user feedback, network on chip (NOC) latency, or NOC queue depth, or combinations thereof.

13. An application-specific dynamic clock voltage scaling (DCVS) circuit in a system-on-a-chip (SOC), comprising:
  means for receiving, in a SOC on an electronic device, crowd-sourced performance data stored outside the electronic device, the crowd-sourced performance data corresponding to at least one execution performance characteristic indicative of an execution performance affecting a perception of a user of responsiveness of an application executing on the SOC;
  means for storing the crowd-sourced performance data for the application executing on the SOC;
  means for determining an application-specific DCVS setting for a subsequently executed application based on the stored crowd-sourced performance data responsive to subsequently executing the application on the SOC;
  means for setting a DCVS parameter of the SOC based on the means for determining the application-specific DCVS setting for the subsequently executed application; and
  means for storing the application-specific DCVS setting in a performance profile corresponding to the application;
  wherein the means for determining the application-specific DCVS setting comprises an application-specific voltage setting or an application-specific clock frequency setting, or a combination of a voltage and a frequency setting.

14. The application-specific DCVS circuit of claim 13, wherein the means for determining the application-specific DCVS setting for the subsequently executed application is based on a previously stored application-specific DCVS setting in the performance profile corresponding to the application.

* * * * *